United States Patent Office 3,433,267
Patented Mar. 18, 1969

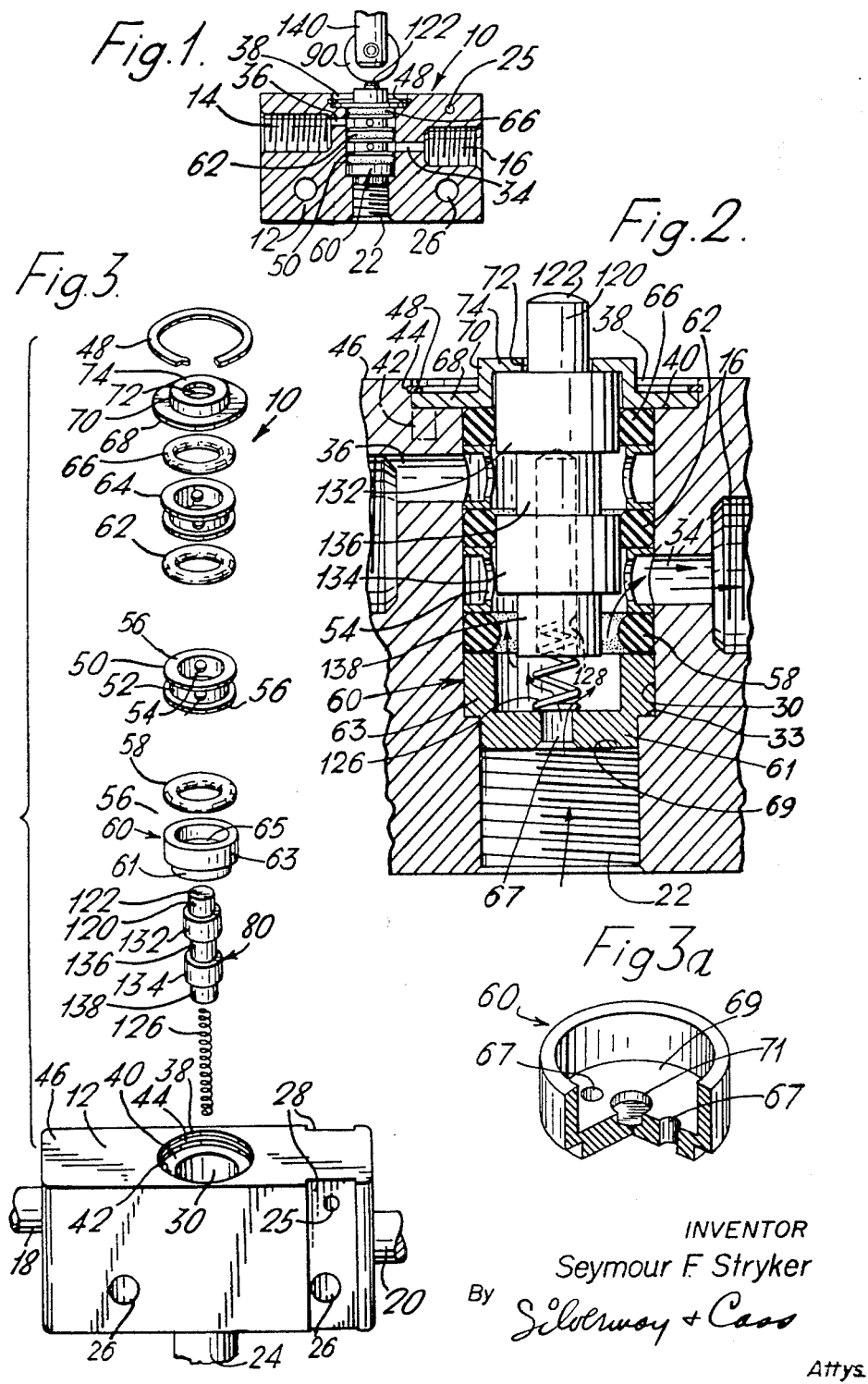

3,433,267
CONTROL VALVE STRUCTURE WITH ALIGNED AXIAL PORT
Seymour F. Stryker, Skokie, Ill., assignor to Air-Mite Devices, Inc., Chicago, Ill., a corporation of Illinois
Filed Aug. 15, 1966, Ser. No. 572,437
The portion of the term of the patent subsequent to Nov. 14, 1984, has been disclaimed
U.S. Cl. 137—625.69     5 Claims
Int. Cl. F16k 11/10

ABSTRACT OF THE DISCLOSURE

A miniature valve structure which is especially suitable for application to valves of relatively small sizes for use in pneumatic systems. The valve including a body provided with a cylindrical valving cavity opening at one end thereof to a first surface of the body, a plurality of lateral ports in said body opening to said cavity on different levels thereof, and a port at the second end of the valving cavity substantially co-axial therewith; a plurality of alternately stacked spacers and annular packing members co-axially engaged in said cavity; a spring-biased plunger having a plurality of valving surfaces disposed within said co-axial spacers and packing members such that reciprocative movement of said plunger establishes different fluid paths between said ports for two different axial positions of the plunger in cooperation with the packing members; and assembly means at said one end of the cavity removably to retain said plunger and the stack spacer and packer members in assembly within the valving cavity such that actuating means may reciprocate said plunger.

This invention relates generally to control valve structures and more particularly is concerned with a novel type of valve structure which is especially suitable for application to valves of relatively small size.

This invention constitutes an improvement over those structures disclosed in copending applications Ser. Nos. 454,462 and 528,184, now Patent Nos. 3,352,324 and 3,352,325, respectively.

As explained in the copending applications, the valve structures of those inventions as well as this are especially intended for installation into pneumatic systems and hence operate to control so-called air-actuated devices. The valve structures are quite small, and operate by virtue of different types of manual or mechanical actuation. Small diameter tubing and miniature fittings are used herein as in the case of the structures described in the said copending applications and hence the valve structures are suitable for use in substitution of electrical switches on production lines, in machinery and the like. Such uses include limit switches, actuating switches, etc.

The principal difference between the structure described herein and those of the copending applications lies in the arrangement of ports and receptacles, relative to the axis of the valve plunger.

In prior structures there was a port opening adjacent an end of a reciprocable plunger, but this port was offset from the axis of the plunger due to considerations of space and the need for providing means to retain the valve in assembly. The receptacle leading to this port was also offset, making it expensive to produce, and complex spacer means had to be used in the bottom of the valve cavity to assure passage of fluid.

The objective of the invention herein is to provide a novel arrangement in which a simple spacer is used at the bottom of the valving cavity which spaces the O-ring and perforated spacer string properly, provides a port comprising passageway means generally aligned with the plunger axis, seats the plunger spring and gives rise to economy and simplicity because the receptacle, port and plunger may be coaxially aligned.

Certain objects are concerned with the provision of specific structural features of the end spacer of the valve assembly.

Many of the objects and advantages of the invention as described in the copending applications apply equally as well herein. Other objects will occur to those skilled in this art as a description of the invention is set forth hereinafter in connection with the drawing which illustrates a preferred embodiment.

In the drawing:

FIG. 1 is a median sectional view through a control valve constructed in accordance with the invention, shown fully assembled with an external roller engaging the end of the plunger 80 to depress the same for actuating the valve.

FIG. 2 is a fragmentary sectional view similar to that of FIG. 1, but on an enlarged scale, and showing the internal details of the valve in a condition in which the plunger is biased to its protruding position.

FIG. 3 is an exploded perspective elevational view of the control valve of the invention and all of its parts.

FIG. 3a is a perspective view of a spacer showing a modified form thereof, parts being broken away to show details.

The invention herein is characterized by providing a control valve structure operated by the reciprocation of a plunger in which there are lateral ports, but in which there is an end port comprising a passageway coaxially aligned with the plunger, and means are provided to connect a conduit in coaxial alignment with port and plunger. Another form has one or more passageways parallel to the plunger axis and slightly offset therefrom.

The invention herein is further characterized by the provision of a spacer ring or plug which serves a plurality of functions while being extremely simple to make and assemble in the valve. The valve structure is capable of universal use with different forms of actuating means to operate the valve. Such means may be external or may readily be associated with the valve structure.

The basic structure of the control valve herein differs from that of the copending applications in that the lower receptacle and the valve plunger cavity herein are coaxial and the lower part comprises a passageway or passageways extending parallel to the receptacle and cavity axis between the same, there being preferably a single annular central coaxial passageway.

Referring now to the drawings, the valve structure of the invention is designated generally by the reference character 10. In the description hereinafter, the word "valve" will be used as a collective word to include the entire structure rather than any particular parts which perform valving operations. The valve 10 is formed of several components, or groups of parts, which perform the various functions contributing to the operation as a whole.

Basically there is a body having various passageways, a principal valving cavity or chamber in the body which has the passageways connecting therewith and provides the multiple packing means in the form of various suitably spaced O-rings to cooperate with the movable plunger to form the several paths for flow of the air or similar fluid during operation of the valve. Means are provided to retain the parts in assembly in such a manner that the plunger end is presented for engagement outside of the valve body by any form of actuating device. Such device will engage the plunger end and reciprocate the plunger. Such device may or may not be secured to the valve body, as will be described.

The body 12 is a simple block of aluminum or brass, which is somewhat elongate as shown in the drawings, this configuration being one of design although probably the most economical when considering the need for screw threaded receptacles 14 and 16 formed at the opposite ends. These receptacles are required to receive the threaded male ends of suitable connecting air conduits 18 and 20 respectively (FIG. 3) when the valve 10 is connected into an air system. Another receptacle 22 is formed in the body 12 opening to the bottom thereof, for receiving the air conduit 24. Heretofore such receptacle had to be offset from the valve plunger which increased production costs. The invention enables this receptacle to be aligned with the plunger axis, being coaxial therewith.

The block is bored transversely at 26 to provide holes for bolts for enabling the valve 10 to be secured in position to a suitable mounting. Likewise, bracket grooves 28 may be milled or cast in the block as shown in FIG. 3 to assist in mounting the valve. Another opening 25 may be drilled through the block 12 in the grooves 28 to accommodate a pin for mounting various kinds of actuating devices.

The body 12 has a vertical valving cavity 30 of cylindrical configuration bored therein and axially aligned with the bottom receptacle 22 and connected with same at 67 as will be explained to provide a bottom port, connecting with the right hand receptacle 16 by means of a small passageway forming a port 34 and connecting with the left hand receptacle 14 by means of another passageway forming port 36. The cavity 30 has an enlarged entrance 38 thereby providing a shoulder 40. This entrance 38 is often called a gallery or recess hereinafter. The gallery 38 has a shallow annular groove 44 spaced from the top wall 46 to receive therein a snap ring 48 of conventional construction, shown in place in FIGS. 1 and 2, and shown independently in FIG. 3.

A string of annular spacers of sleeve-like configuration and O-rings is located within the valving cavity, and held in place by the snap ring 48 in a manner to be described. The top two annular spacers have the same construction and hence attention may be directed to the lower one 50 in FIG. 3 for the description of both. There is an axial cylindrical portion 52 with radial holes 54 circumferentially spaced about the cylindrical portion, and each end has a flange 56 integral therewith. The O-rings are conventional in construction.

At the bottom of the cavity 30, there is an imperforate spacer sleeve 60, above which is an O-ring 58, first perforated spacer sleeve 50, second O-ring 62, second perforated spacer sleeve 64 and third O-ring 66. Reference to "perforate" or "imperforate" is intended to mean whether or not the spacer has lateral holes. The central axial opening is required even in the imperforate spacer 60. The spacers and O-rings are held in the relationship described with a predetermined pressure, since the O-rings are made of rubber or equivalent material, and are resilient. Pressure is applied by means of the lower flange 68 of the retainer 70 that is in the form of a brimmed hat-shaped member having a central opening 72 located in the upper wall 74 for a purpose to be described.

The spacer 60 is an important structural element of the invention. It provides a plurality of functions resulting in the improvement comprising the invention herein. The cavity 30 and the receptacle 22 are of different diameters, but coaxial. Thus a shoulder 33 is formed on the interior of the valve, the spacer 60 having a reduced diameter cylindrical plug portion 61 engaging in the upper end of receptacle 22 to seat the spacer 60. The body 63 of the spacer is cylindrical, and hollow, as at 65. The upper edge of the body 63 engages the lower O-ring 58. The plug portion has a central passageway 67 which enables the passage of fluid but is small enough to enable the plug portion 61 to seat the bottom end of spring 126. This passageway 67 comprises the port for receptacle 22 and is smaller in diameter than the spring diameter. The seat is designated 69.

It will be noted that the bottom port 67 is used only when the spring 126 is extended, so that fluid can freely pass through the spring convolutions.

The valve includes a plunger 80 which is disposed in the valving cavity in engagement with the O-rings. The plunger has a reduced diameter follower end 120 with a rounded tip 122 that protrudes from the valve to be engaged by some actuating means to reciprocate the plunger. The plunger is biased outwardly by means of the coil spring 126 that is retained in a hollow recess 128 formed in the plunger 80 and opening to the bottom end thereof and engaging on the seating surface 69 of the lower spacer 60. The follower end 120 passes through the opening 72 in the retainer 70 and its reciprocation does not affect the pressure applied by the retainer to the spacer-O-ring string.

The plunger 80 has two spaced cylindrical valving surfaces 132 and 134 separated by a necked portion 136, the lower surface 134 being spaced from the bottom end of the plunger by means of a reduced diameter portion 138.

Movement of the plunger 80 up and down accomplishes the valving functions of the valve 10. This is done in a more or less conventional manner and involves cooperation between the valving surfaces and the O-rings. This may be explained as follows:

Assume initially that the valve 10 is in the condition shown in FIG. 2. The plunger 80 is biased upward to its maximum extent by the spring 126 and with the tip 122 protruding its maximum extent. In these circumstances, the port 36 opens into the cavity 30 by way of the holes of the spacer 64, but the valving surfaces 132 and 134 are in engagement with the O-rings 66 and 62, respectively, and hence a blind end is produced at the spacer 64. The O-rings are under sufficient compression such that they act as packing means to prevent any passage of air by way of the port 36 to other parts of the valve 10.

The same conditions prevailing, there is free passage between the receptacles 22 and 16 by way of the cavity 30. A direction of fluid flow is assumed to be from the conduit 24 to the conduit 20. Air follows the arrows of FIG. 2, entering from the bottom port 67, passing through the hollow 65 of spacer 60 past convolutions of the spring 126 and the O-ring 58, through the holes of the spacer 50 and out the port 34. The connection is thus established between the conduits 24 and 20.

Assuming that a moving member 140 (FIG. 1) having the roller 90 engages the end 122 and pushes the same inward, the conditions of the valve 10 are as shown in FIG. 1. The spring 126 is compressed. The plunger 80 has been pushed downward until the reduced diameter end 138 is engaged against or close to the surface 69. Now the valving surface 134 has moved out of engagement with the O-ring 62 and into engagement with the O-ring 58 thereby blocking passage of any air by way of the bottom port 67. The valving surface 132 has moved axially with the plunger 80 but has not left its engagement with the O-ring 66. Accordingly, it will be appreciated that this O-ring is a continuously engaged packing member which prevents escape of any fluid out of the cavity 30 by way of the housing during the operation of the valve. The necked portion 136 is now disposed alongside the O-ring 62 so that air is free to pass this O-ring. Accordingly, air may now pass from the receptacle 14 by way of the port 36 into the cavity 30 through the holes of the spacer 64, past the O-ring 62, through the holes of the spacer 50 and out of the port 34 into the receptacle 16. The connection is thus established between the conduits 18 and 20.

In copending application, Ser. No. 454,462, different means are disclosed for retaining the parts of the valve in assembly. In the said copending application, Ser. No. 454,462, the pressure thimble comprises that part of the retainer 70 which excludes the integral bottom flange end 67 so that the principal function of the pressure thimble is to apply pressure to the string of O-rings and spacers. There is a push-rod assembly and a housing for the push-rod assembly, the housing having a bottom flange and an interior cavity into which the thimble top engages so that the bottom flange may be locked into the gallery 38 on the shoulder 40 and held in place by a similar split ring 48. This then permits the thimble to maintain its pressure on the string. The push-rod assembly includes a roller which is adapted for disposition on axes normal to one another, and for this purpose, the flange at the bottom of the housing has indexing notches cooperating with a pin set into the shoulder 40. The hole for such pin may be provided in the structure described herein as shown in broken lines at 42 in FIG. 2, so that the structure is adapted for use with a variety of actuating means and retaining structures other than specifically using the retainer 70.

The brimmed hat shaped retainer 70 herein serves a plurality of functions in the valve structure of this invention as described in copending application, Ser. No. 528,184. It performs the function of applying pressure to the string of O-rings and spacers by means of the bottom surface of the integral flange 68 as shown in FIG. 2. Its flange 68 is seated in the gallery 38 on the shoulder 40 and held in place by the split ring 48, which is readily removable. Since the end 120 of the plunger 80 protrudes through the opening 72, the retainer 70 centers the plunger and guides it in its movement. Since the valving surface 132 is pressed upward its maximum extent by the spring 126, the end of the enlargement providing the valve surface engages against the inside of the end wall 74 of the retainer 70 so that the retainer limits the outward extent of movement of the plunger 80. The retainer 70 also keeps the entire valve structure in assembly, and also enables direct engagement of the plunger end 122 by some outside actuating means. As stated in said copending application, Ser. No. 528,184, this structure, for most applications of the valve, enables the use of simple, economical and direct actuating means. It also keeps the dimensions of the valve small.

The invention herein considerably simplifies the valve and enables greater economy in the manufacture, while affording ease in assembly. The structure using the axially aligned receptacle 22 and valving cavity 30 solves problems of production and assembly. The tools used to make both of these openings are easier to handle. The spacer 60 provides a plurality of functions including: forming the port 67 for the receptacle 22, seating the spring 126, spacing the string of O-rings and spacers properly. It is much cheaper to make than a spacer ring like rings 50 and 64 and easily drops right into position on assembly. The formation of shoulder 33 is a simple and easily-accomplished matter.

If desired, as shown in FIG. 3a, the spacer 60 may have the port 67 formed of one or more openings spaced from the axial center, so that the spring 126 seats on an imperforate portion of the surface 69 or even in an annular socket 71 provided therefor.

What it is desired to secure by Letters Patent of the United States is:

1. A valve for controlling operation of a fluid operated device as a result of movement of external actuating means, said valve having a body member provided with a cylindrical valving cavity opening at one end to a first surface of said body member, a plurality of alternately stacked spacers and annular packing members co-axially engaged and mounted in said cavity, at least two lateral ports in the body member opening to said cavity on different levels thereof, a port at the second end of the valving cavity substantially co-axial therewith and having communication to a second surface of said body member, said second surface being opposite to said first surface, a plunger having a plurality of valving surfaces and adapted to be reciprocated to establish different fluid paths between ports for two different axial positions of the plunger in cooperation with said packing members, assembly means at said one end of the cavity and connected to said first surface removably to retain said plunger and the stacked spacer and packing members in assembly within the valving cavity such that actuating means may reciprocate said plunger, said plunger being biased to move outwardly of the cavity toward said one end by a spring, said assembly means including structure to limit such outward movement, one of said axial positions being of the limit of said outward movement, and the one of said spacers disposed in said cavity adjacent the second end thereof having axially extending passageway means defining said port at said second end of the valving cavity, and means for seating an end of said spring, the other end of the spring engaging the plunger to bias same axially outward.

2. A valve structure as defined in claim 1 in which there is communication between the said end port and a lateral port through the convolutions of said spring when the plunger is in said one axial position, and in which the said communication is blocked by engagement of a valving surface and packing member when the plunger is moved inward of said cavity to compress said spring.

3. A valve structure as defined in claim 1 in which the communication between said end port and fourth surface of the body member includes a threaded receptacle for a conduit, said receptacle being co-axial with said cavity and the plunger.

4. A valve structure as defined in claim 1 wherein said cavity has a shoulder formed in its second end and said one spacer has a reduced diameter plug portion defining a flange seated on said shoulder to hold said spacer in the cavity, said spacer being cylindrical and hollow to define an imperforated annular laterally extending wall, the other of said spacers including perforated lateral walls to provide for communication between the respective ports.

5. A valve structure as defined in claim 1 wherein said passageway means in said one spacer includes a plurality of openings spaced from the axial center of said spacer.

References Cited

UNITED STATES PATENTS

| | | | |
|---|---|---|---|
| 3,195,574 | 7/1965 | Carls | 137—625.69 |
| 3,229,721 | 1/1966 | Bingel | 137—625.69 |
| 3,236,251 | 2/1966 | Hansen | 137—625.68 |
| 3,279,748 | 10/1966 | Coulter | 251—263 |

HENRY T. KLINKSIEK, *Primary Examiner.*